Sept. 8, 1936.	P. W. GAENSSLE	2,053,710
WHEEL STRUCTURE
Filed May 27, 1932
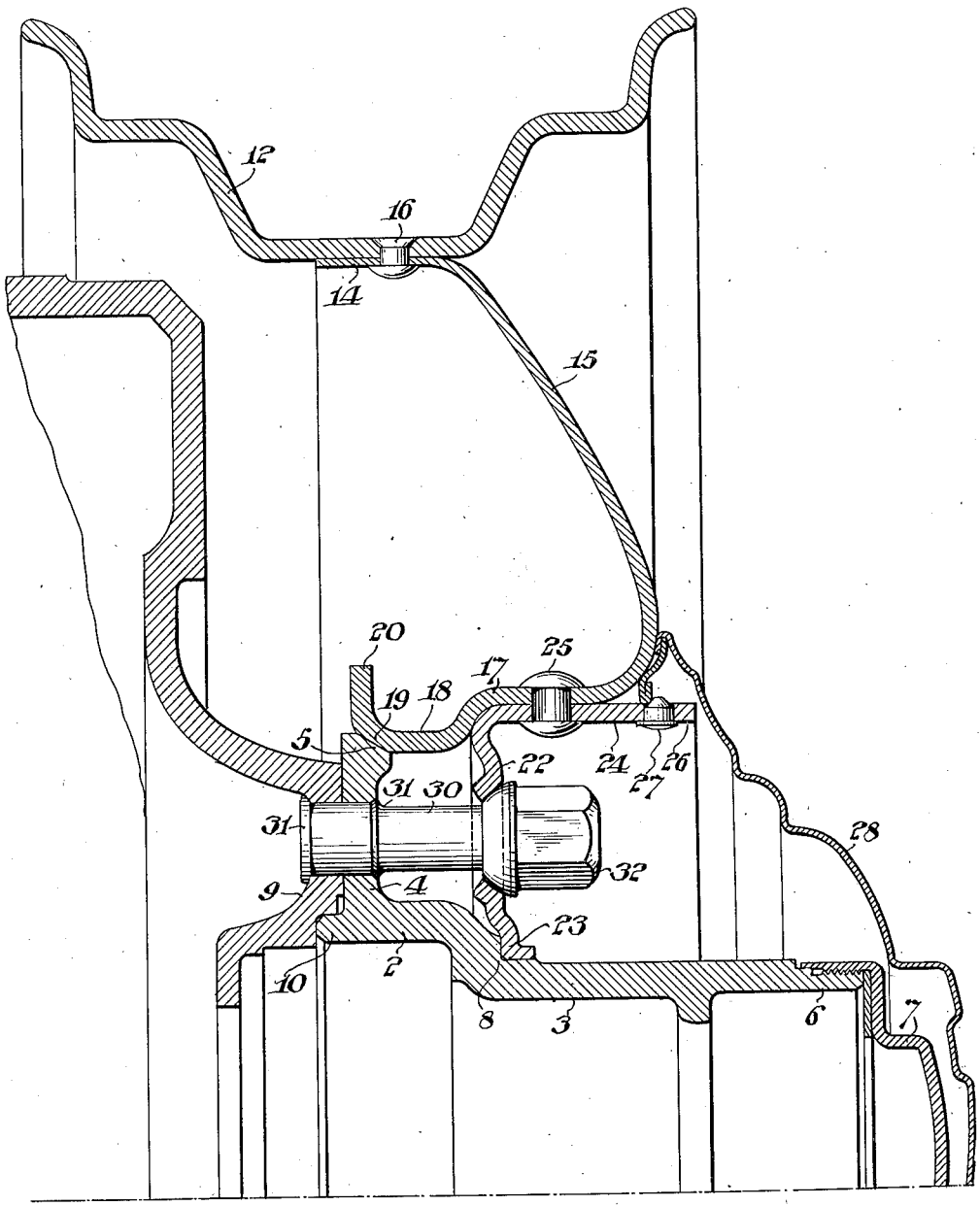
INVENTOR.
PAUL W. GAENSSLE
BY John P. Barbor
ATTORNEY.

Patented Sept. 8, 1936

2,053,710

UNITED STATES PATENT OFFICE 2,053,710

WHEEL STRUCTURE

Paul W. Gaenssle, Detroit, Mich., assignor to Budd Wheel Company, Philadelphia, Pa., a corporation of Pennsylvania Application May 27, 1932, Serial No. 613,803

2 Claims. (Cl. 301—9)

My invention relates to wheels and particularly to metal wheels for heavy-duty vehicles.

One object of my invention is to provide a wheel, of the above-indicated character, that shall comprise an annulus of substantially box-section including detachable elements of the hub and body, whereby to render the structure of increased strength and reduced weight.

Another object is to provide a combined mounting plate and hub-cap receiver, also constituting a mounting-bolt cover, a conical disc of new configuration and a structure that lends itself to graceful outlines, easy centering and assembly, and that has other advantages.

A further object of my invention is to provide a wheel that shall be simple and durable in construction, economical to manufacture and effective in its operation.

In practicing the invention, a hub is provided with a flange having a sloping outer perimeter of front-converging conical shape. A shoulder, parallel to the wheel plane, which, together with an outer cylindrical surface of the hub, constitutes a seat of substantially L-section, is disposed on the hub, with its radial side axially-spaced from the flange.

A mounting-element, or plate, is of single-piece pressed sheet-metal construction, including a cylindrical, or tubular, portion for receiving the disc and the hub cap, and embodies an inner-end mounting plate, or ring, having a portion of substantially L-section fitting the seat of corresponding section on the hub.

A preferably conical-disc body is provided with a radially-outermost portion, or portions, secured to the rim, a cylindrical inner-perimetral portion, secured in concentric interfitting relation to the tubular mounting plate portion, and an axial portion of substantially channel section spanning the space between the mounting plate and the flange. This section also, has a conical or sloping annular edge fitting the sloping outer perimeter of the flange and one side constituting an annular reinforcing flange that extends radially inward relative to the disc and radially outward relative the hub.

The flange and the hub constitute two fixed sides of the box-section annulus, of which the other two sides are the mounting plate and the inner channel section of the disc. A brake drum is mounted, with its head against the rear side of the flange, and mounting bolts permanently secure the head to the flange and extend axially through the box section and the mounting plate for the reception of cap nuts. The outer end of the mounting-plate cylinder receives the hub cap, which conceals the cap nuts.

In mounting the body, the above-mentioned conical interfitting portions, between the disc and the flange, being spaced a substantial distance diagonally, in an axial plane, from the seats between the hub and the mounting plate, provide means for quickly and accurately centering the wheel.

The box-section annulus, reinforced by the rim bolts, permits the structure to be of substantially minimum material and weight, and provides great strength in all directions.

The inturned disc-flange is preferably at, or very near, the load wheel plane so that it adds considerable strength at this position.

The disc and the hub cap provide a particularly attractive conical effect from the rim to the wheel axis; the relation of the cap to the disc permitting versatility of ornamentation for the front side of the wheel.

The single figure, of the accompanying drawing, is a view, in axial section, of a wheel constructed in accordance with my invention.

The hub comprises portions 2 and 3 of large and small diameters, respectively, on the larger portion of which, a flange 4 is provided and has an axially-outwardly-diverging conical portion 5 at its outer perimeter. The portion 3 has a threaded outer end 6, for receiving a grease cap 7, and a shoulder 8 of substantially L-section axially spaced from the flange 4.

A brake drum has a front-projecting head portion 9, of annular channel section, fitted to the inner side of the flange 4, over an axial portion 10 of the hub.

A rim 12, shown as of pressed sheet-metal and of the drop-center type, is suitably secured to a cylindrical outer perimeter 14 of a disc body 15, as by a rivet or rivets 16.

The disc 15 is preferably of axially-curved conical-shape of tapering gauge or thickness from the perimeter 14, radially inward toward the hub, to a cylindrical inner perimeter 17 having an annular section 18 of channel section, a tapered portion 19, fitting the flange perimeter 5, and a radial flange 20 at about the load plane of the wheel.

The disc 15 is thus, an annulus of substantially channel section between, and including, its outer and inner perimeters 14 and 17, respectively; the flange 20 projecting radially outward of the hub and radially inward of the disc or its channel section.

A mounting plate element includes a plate or mounting flange portion 22, for mounting the disc and rim, an inner perimeter 23, of L-section, fitting the seat 8, and a front-axial projection 24, of tubular or cylindrical form, concentrically interfitting the inner perimetral cylinder 17 of the disc 15, to which it is suitably secured, as by a rivet, or rivets, 25. It further comprises an outer end 26 carrying one or more devices 27 for detachably receiving a hub cap 28 which preferably further continues the general conical contour of the disc 15, or is otherwise shaped, in view of the shape of the disc, to provide an ornate wheel face of balanced, and symmetrical, outline.

A stud or bolt 30 has flanges 31, by which it permanently secures the brake-drum portion to the flange 4, and projects axially through the mounting plate 22 for the reception of a cap nut 32.

The annulus of box section, comprised by the hub portion 2 and the flange 4, as two fixed sides, and the portion 18 and the plate 22, as two other fixed sides detachably related to the first two sides, provides great strength in all directions, in proportion to the amount of material involved, which may thereby be substantially less than another structure of equivalent strength.

The diagonal relation, and substantial distance, between the parts 5—19, at one position, and the parts 8—23, at the opposite position provide means for easily, quickly and accurately centering the wheel body on the hub.

The channel section 18, the flange 20 and the tapered-gauge channel-section disc 15 provide a body of remarkable strength and balance, for the amount of material involved, which, in conjunction with the box-section annulus, above set forth, and other features, provide a particularly effective and ornate wheel.

While I have shown and described a particular form of my invention, changes may be effected therein without departing from the spirit and scope thereof, as set forth in the appended claims.

What I claim is:

1. A wheel comprising a hub including axially and radially-shaped annular-flange and seat portions of sloping-outer perimetral and L-section, respectively, a rim, a conical disc member of rear-opening channel section having an outer perimeter secured to the rim and a cylindrical inner perimeter having a radially outwardly extending inner-end flange and a sloping portion fitting the sloping flange perimeter, a mounting element including a tubular section secured to the inner perimeter and embodying an outer-end hub cap mounting portion and an inner-end mounting plate portion having a portion of L-section fitting the seat, an axial mounting bolt connecting the hub flange portion and the mounting plate portion, and extending through said mounting plate portion.

2. A demountable vehicle wheel comprising a hub having a radial flange, a rim supporting annulus of substantially axially inwardly opening deep channel section, said annulus presenting an axially outer surface substantially conical, and a bolting-on flange, said annulus being seated upon said hub flange and said annulus being further supported by said bolting-on flange axially outwardly spaced from said hub flange, said bolting-on flange being seated on said hub and also providing a support for a hub cap adapted to enshroud said bolting-on flange and hub and adapted to continue substantially the contour of said outer surface of said annulus.

PAUL W. GAENSSLE.